E. FULDA.
ELECTRIC WELDING TRANSFORMER.
APPLICATION FILED JULY 15, 1913.

1,199,537.

Patented Sept. 26, 1916.
3 SHEETS—SHEET 1.

WITNESSES

INVENTOR
Edward Fulda
BY
ATTORNEYS

E. FULDA.
ELECTRIC WELDING TRANSFORMER.
APPLICATION FILED JULY 15, 1913.
1,199,537.
Patented Sept. 26, 1916.
3 SHEETS—SHEET 2.
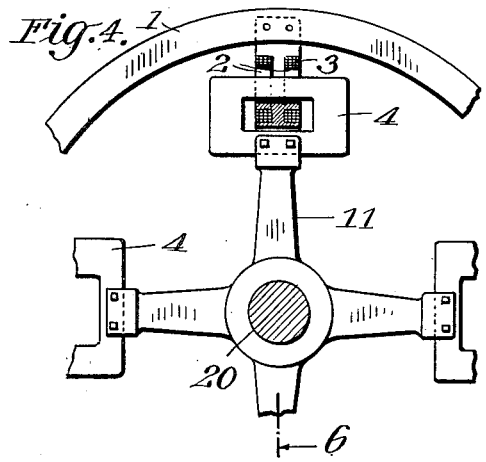
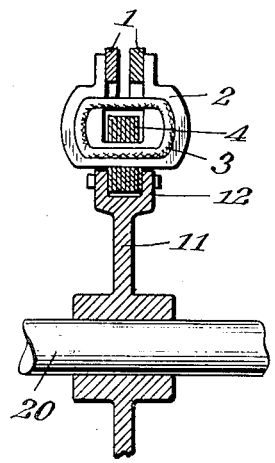
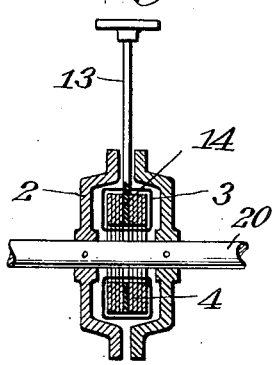
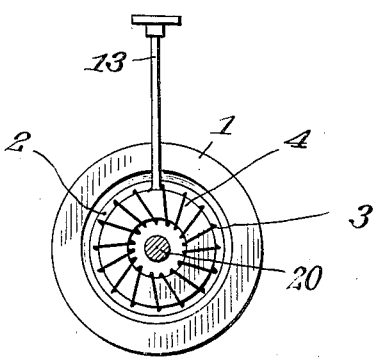
WITNESSES
INVENTOR
Edward Fulda
BY
ATTORNEYS

E. FULDA.
ELECTRIC WELDING TRANSFORMER.
APPLICATION FILED JULY 15, 1913.

1,199,537.

Patented Sept. 26, 1916.
3 SHEETS—SHEET 3.

WITNESSES
F. B. Townsend
Irene Lefkowitz

INVENTOR
Edward Fulda
BY
Townsend & Decker
ATTORNEYS

UNITED STATES PATENT OFFICE.

EDWARD FULDA, OF NEW YORK, N. Y.

ELECTRIC-WELDING TRANSFORMER.

1,199,537.  Specification of Letters Patent.  Patented Sept. 26, 1916.

Application filed July 15, 1913. Serial No. 779,091.

*To all whom it may concern:*

Be it known that I, EDWARD FULDA, a citizen of the United States, and a resident of New York, in the county of New York and State of New York, have invented certain new and useful Improvements in Electric-Welding Transformers, of which the following is a specification.

My invention relates to the construction of apparatus in which a roller contact or electrode is employed combined with an alternating current transformer of the type in which energy is converted into a current of great heating power for use in electric welding and similar operations.

The invention is particularly useful for apparatus in which the rotating electrode or roller contact is employed for making a continuous electrically welded seam by making continuous electrical connection with the surface upon which it rides.

One of the objects of my invention is to permit the application of the full developed capacity of the alternating current transformer to the work as well as to secure other advantages in respect to simplicity and compactness of apparatus not attainable by the previous constructions, wherein the rotating disk or roller contact is supplied with energy from the transformer through axial bearings or similar moving joints between the transformer secondary and the roller contact.

My invention consists of a roller contact electrode or electrodes having a continuous conductor for the whole periphery and supplied by a transformer secondary or by preferably a number of transformer secondaries in multiple, said transformer secondary or secondaries and the continuous roller contact forming a single or unitary rotary structure, as will be more particularly described in connection with the accompanying drawings and then specified in the claims.

My invention may be carried out in various forms of structure differing in their details, some of which forms are shown in the accompanying drawings, wherein—

Figure 1 is a side elevation and partial section of a combined roller contact and transformers embodying my invention. Fig. 2 is a horizontal section on the line 2—2 Fig. 1. Fig. 3 is a side elevation of one of the forms of laminated iron plates that may be used in constructing the core portion of the transformers shown in Fig. 1. Fig. 4 shows a modification in the manner of mounting the transformers. Fig. 5 is a vertical cross-section through the apparatus shown in Fig. 4. Fig. 6 is a vertical section through a modification of the apparatus in which the secondary alone rotates. Fig. 7 is a side elevation of the same. Fig. 8 shows in side elevation another form of the invention in which all the parts of the transformer rotate with the roller contact or electrode. Fig. 9 is a vertical section through the same. Fig. 10 illustrates the application of the invention to the forming of a lap-welded seam. Fig. 11 shows the application of the apparatus shown in Fig. 9 to the formation of a butt-weld. Fig. 12 shows the transformer portion of the apparatus as a two-phase transformer.

Referring more particularly to Figs. 1, 2 and 3 of the drawings, the contact 1 is a continuous ring or disk adapted to make continuous rolling and electrical contact with the surface to be supplied with the heating current. Two such roller contacts are shown answering respectively to the terminals or poles of the transformer portion of the apparatus. 20 is a shaft or axis for said roller. 2 indicates the secondary of each of a series of transformers, shown in Fig. 1 as four in number, although a greater or less number may be employed. These secondaries, as usual in the art, consist of heavy bars or masses of copper, associated with which are primary coils 3 of any suitable character applied in proper inductive relation to the masses of copper 2, so as to suitably transform the electric energy supplied to the primaries into energy suitable for application as heating current to any pieces of metal engaged by the roller contacts 1. 4 indicates the mass of laminated iron constituting the core of the transformer or transformers. These cores are made up as usual of laminated iron, the plates or members of which may take the form shown in Fig. 3 and may be suitably fastened to the shaft or axis 20, so as to rotate therewith and to afford at the same time a frame or spider constituting the frame of the rotary structure upon which the roller contacts and the members of the transformer or transformers are mounted. Each radial extension being, as shown, in the form of a parallelogram cut away at the center, the secondary 2 and the coils 3 may be wound upon the legs of said parallelograms in any desired way, either upon the same or opposite legs. For the most efficient operation, it is preferable to apply them to the same leg, as shown in Fig. 5, and as is well understood in the art. The special disposition of the secondary, primary and core constituting the transformer with relation to one another to secure the most efficient action, is well understood in the art and constitutes no particular part of my invention. Figs. 1, 2 and 3 of the drawings, it will be understood, are principally diagrammatic in their nature, in so far as I have not attempted to illustrate in them the number of points of subdivision of the parts which would in practice be resorted to in order to permit parts of the apparatus to be conveniently assembled. As will be seen, the transformer secondaries 2 terminate in the roller contacts 1 and supply the same with energy in multiple and so that by a proper multiplication of the transformers, a substantially uniform tension of secondary or heating current will exist at all portions of the periphery of the roller contact. The primary current is supplied to the primary coils 3 by the simple expedient of conducting rings 8 and brushes 9, the rings 8 being mounted on the shaft 20 and rotating therewith, while the brushes 9, which engage the rings, are fixed and are connected to the usual source of alternating currents. The disks or plates 5 which make up the laminated portion of the structure may be clamped on the shaft between plates 7 or in any other suitable manner, as commonly employed in constructing alternating current dynamos.

As shown in Figs. 4 and 5, the continuous rings or roller contacts 1 may be bolted to the terminals of the secondary 2 and each transformer may be independently mounted upon a radial arm or spoke of the structure carried by the main shaft. This modification illustrates also an efficient relation of primary and secondary, the primary being wound on the same leg of the core as the secondary and in grooves in the side of the latter. Instead of mounting the whole structure of the transformer to rotate with the roller contact, the secondary thereof alone may be mounted to rotate and the remaining portions of the transformer be fixed. This modification of my invention is illustrated in Figs. 6 and 7. The secondary 2 here is shown as comprising a pair of circular disks or plates, which may be webbed or not, carried by a hub, forming in effect the inner turn of the secondary, said hub being properly fastened to the rotary shaft 20. Within said disks the laminated core 4, shown here as a ring, is sustained in fixed position by a hanger 13, which depends between the disks and terminates in a ring 14, to which the laminated core is bolted. The primary 3 is disposed on said core and supported thereby, also in fixed position in any desired way. This construction obviously dispenses with the use of collector rings 8 or similar devices for conveying the energizing current to the primary.

Figs. 8 and 9 illustrate a construction similar to that of Figs. 6 and 7 in the form of the parts, but differing therefrom in that all the elements of the transformer rotate with the roller contact 1, and the core 4, instead of being annular in form, as shown in Fig. 7, is rectangular. In this instance, it is desirable that the shaft 20 be of good conducting material in order that it may form the inner portion of the secondary turn by conductively uniting the arms 15, which terminate in the rings or disks 1. As indicated in Fig. 8, one or both rollers may have projections disposed on its periphery at any desired intervals, each projection being adapted to form a spot weld. Two of said projections, only, are shown in the figure. The form of the edge of the roller contact may obviously be made as desired. It may, for instance, take the form shown in Figs. 10 and 11.

Fig. 10 illustrates the application of the device to the making of a lap weld between two pieces of sheet metal 16 disposed upon suitable supports 17 and engaged with a rolling contact connected by the roller contacts 1 which feed current and apply pressure on the line of the seam.

Figure 1:
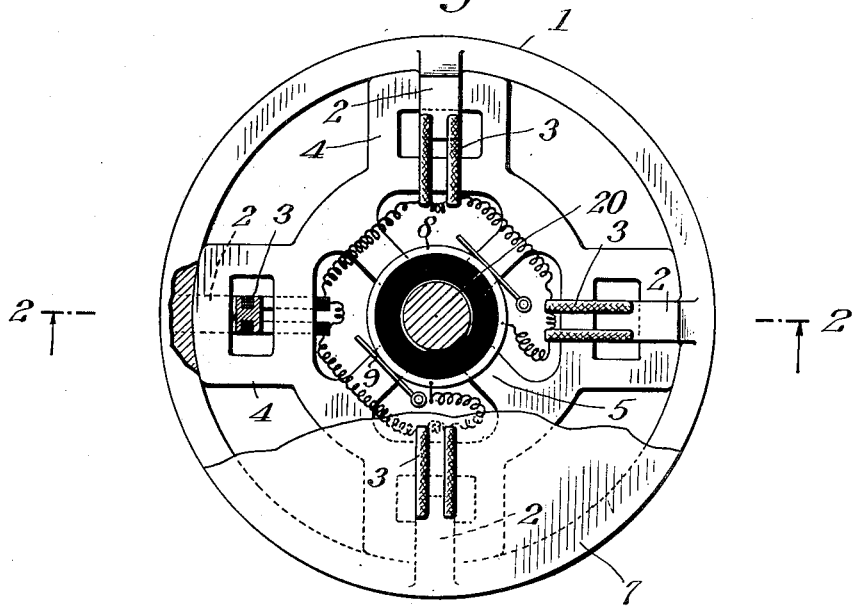
Figure 2:
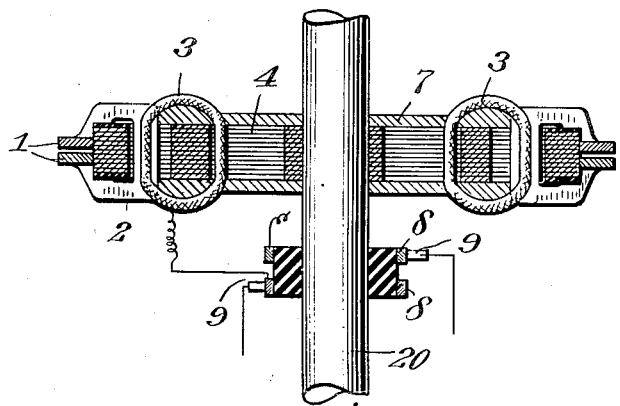
Figure 3:
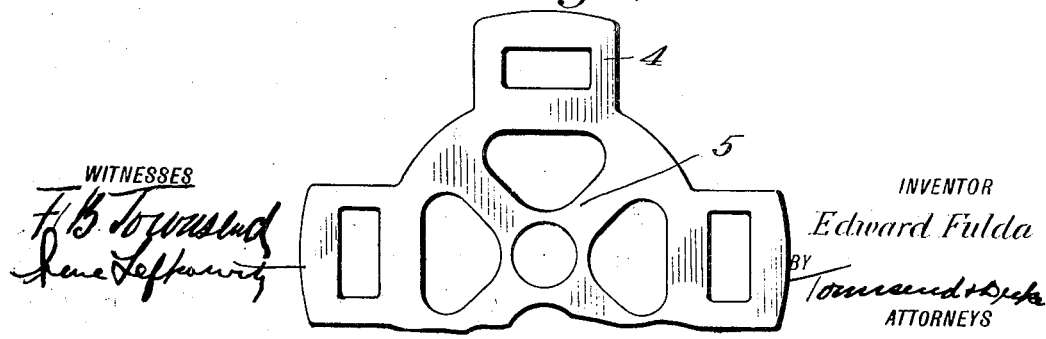
Figure 9:
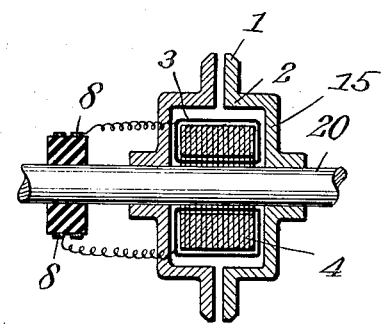
Figure 8:
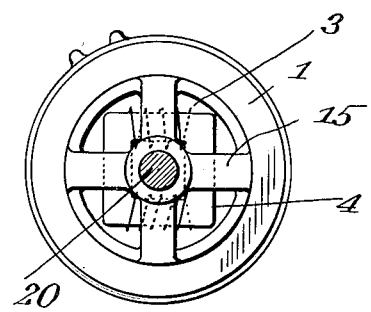
Figure 10:
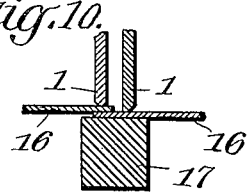
Figure 11:
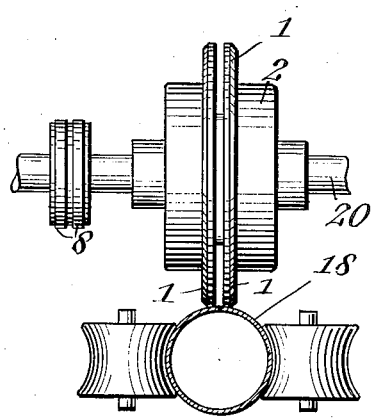
Fig. 11 illustrates a similar application of the device to conveying heating current to a joint or seam to be butt-welded in a tube or pipe 18, the side pressure of the rollers being at the same time employed to make a butt-weld.
Figure 12:
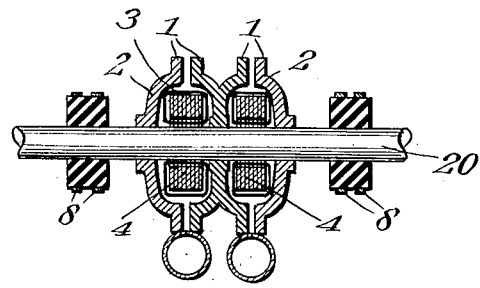
Fig. 12 shows the invention as carried out with a two-phase transformer each of which structurally is similar to the construction shown in Fig. 9. The figure is self-explanatory, and the application of my invention to two-phase transformers of other and different structural details will be evident to those skilled in the art from inspection of this figure.

As will be evident from the foregoing description, the disks forming the secondary may be either solid or of spider construction and connected at their centers to complete the secondary circuit, the former construction being indicated in Figs. 6, 7 and 11 and the latter in Figs. 8 and 9, in which various figures the disks inclose the core and primary windings, which latter may be mounted to rotate or not, as desired, with the secondary.

Other applications of my invention besides to lap or butt-welding of tubes, sheets or cylinders will readily occur to those skilled in the art. Besides eliminating the loss sustained by the low-potential secondary current at the axis upon which roller contacts as heretofore constructed have been made to revolve, it will be obvious that my invention permits the secondary and circuit thereof to be made very short, thereby diminishing the considerable loss hitherto sustained in similar apparatus from the resistance of the unnecessarily long secondary and also secures a substantial uniformity of heating current all around the roller.

What I claim as my invention is:—

1. In an alternating current transformer, a rotary secondary terminating in a roller contact forming the whole periphery of the roller.

2. A continuous roller contact electrode combined with a series of alternating current transformer secondaries rotating therewith and symmetrically connected thereto.

3. The combination of a pair of concentric and continuous rings forming roller contacts and a series of alternating current transformer secondaries mounted to rotate therewith, the two poles of said secondaries being connected respectively to the rings at points uniformly distributed around the circumference thereof so that the contacts will form terminals common to all.

4. A roller contact or electrode for electric welding and similar purposes, comprising a contact having a continuous conducting periphery and a series of alternating current transformers mounted to rotate therewith and having their secondaries connected in multiple to said roller.

5. A combined alternating current transformer and roller contact device comprising a pair of continuous conducting roller electrodes concentrically mounted and forming respectively the terminals of a transformer secondary mounted within and rotating with them.

6. A pair of roller contacts combined with a series of transformer secondaries mounted within and on the same shaft with said roller contacts and having their poles terminating respectively in said contacts.

7. A rotating transformer secondary having its poles terminating in a pair of conducting roller contact rings as and for the purpose described.

Signed at New York in the county of New York and State of New York this 11th day of July A. D. 1913.

EDWARD FULDA.

Witnesses:
F. B. TOWNSEND,
IRENE LEFKOWITZ.